United States Patent
Goldman et al.

(10) Patent No.: US 9,026,524 B1
(45) Date of Patent: May 5, 2015

(54) COMPLETING QUERIES USING TRANSITIVE CLOSURES ON A SOCIAL GRAPH

(71) Applicant: Relationship Science LLC, New York, NY (US)

(72) Inventors: Neal Goldman, New York, NY (US); John C. Dingee, Bronxville, NY (US); Robert Liander, Staten Island, NY (US); Brett Brown, New York, NY (US)

(73) Assignee: Relationship Science LLC, New York, NY (US)

( * ) Notice: Subject to any disclaimer, the term of this patent is extended or adjusted under 35 U.S.C. 154(b) by 113 days.

(21) Appl. No.: 13/738,273

(22) Filed: Jan. 10, 2013

(51) Int. Cl.
*G06F 17/30* (2006.01)

(52) U.S. Cl.
CPC ............... *G06F 17/30466* (2013.01)

(58) Field of Classification Search
CPC ..................................... G06F 17/30
USPC ......................................... 707/714
See application file for complete search history.

(56) References Cited

U.S. PATENT DOCUMENTS

| | | | | |
|---|---|---|---|---|
| 5,819,257 | A * | 10/1998 | Monge et al. ..................... | 1/1 |
| 8,185,558 | B1 | 5/2012 | Narayanan et al. | |
| 8,386,482 | B2 | 2/2013 | Gopalakrishnan | |
| 8,736,612 | B1 * | 5/2014 | Goldman et al. ............. | 345/440 |
| 8,739,016 | B1 * | 5/2014 | Goldman et al. ............. | 715/200 |
| 8,773,437 | B1 * | 7/2014 | Goldman et al. ............. | 345/440 |
| 8,893,008 | B1 * | 11/2014 | Goldman et al. ............. | 715/736 |
| 2003/0187813 | A1 | 10/2003 | Goldman et al. | |
| 2005/0027797 | A1 | 2/2005 | San Andres et al. | |
| 2006/0020886 | A1 | 1/2006 | Agrawal et al. | |
| 2006/0075335 | A1 | 4/2006 | Gloor | |
| 2006/0136419 | A1 | 6/2006 | Brydon et al. | |
| 2006/0195442 | A1 | 8/2006 | Cone et al. | |
| 2007/0124291 | A1 | 5/2007 | Hassan et al. | |
| 2008/0070495 | A1 | 3/2008 | Stricklen et al. | |
| 2008/0071796 | A1 | 3/2008 | Ghuneim et al. | |
| 2008/0086343 | A1 | 4/2008 | Pendergraft et al. | |
| 2008/0147722 | A1 * | 6/2008 | Dolin et al. ............... | 707/103 R |
| 2008/0288277 | A1 | 11/2008 | Fasciano | |
| 2009/0018918 | A1 | 1/2009 | Moneypenny et al. | |
| 2009/0027392 | A1 | 1/2009 | Jadhav et al. | |
| 2009/0106822 | A1 | 4/2009 | Obasanjo et al. | |
| 2009/0228296 | A1 | 9/2009 | Ismalon | |
| 2009/0259599 | A1 | 10/2009 | Wallman | |
| 2010/0082695 | A1 | 4/2010 | Hardt | |
| 2010/0119053 | A1 | 5/2010 | Goeldi | |
| 2010/0153185 | A1 | 6/2010 | Ghosh et al. | |
| 2010/0241638 | A1 | 9/2010 | O'Sullivan et al. | |
| 2010/0268719 | A1 | 10/2010 | Cormode et al. | |
| 2010/0274815 | A1 | 10/2010 | Vanasco | |

(Continued)

OTHER PUBLICATIONS

U.S. Appl. No. 13/548,191, filed Jul. 12, 2012.

(Continued)

*Primary Examiner* — Apu Mofiz
*Assistant Examiner* — Farhad Agharahimi
(74) *Attorney, Agent, or Firm* — Aka Chan LLP

(57) ABSTRACT

A system gathers information on influential people and builds a social graph. The system is flexible in what types of information it gathers so that a detailed picture on influential persons can be determined. The information is organized to allow users of the system to make fast searches with the system and draw meaningful conclusions from the information.

37 Claims, 12 Drawing Sheets

(56) References Cited

U.S. PATENT DOCUMENTS

| | | |
|---|---|---|
| 2011/0029521 A1 | 2/2011 | Thayne et al. |
| 2011/0037766 A1 | 2/2011 | Judy et al. |
| 2011/0055186 A1 | 3/2011 | Gopalakrishnan |
| 2011/0173046 A1 | 7/2011 | Dey et al. |
| 2011/0295626 A1 | 12/2011 | Chen et al. |
| 2012/0079023 A1 | 3/2012 | Tejada-Gamero et al. |
| 2012/0096002 A1 | 4/2012 | Sheehan et al. |
| 2012/0166348 A1 | 6/2012 | Dyagilev et al. |
| 2012/0179674 A1* | 7/2012 | Delling et al. ............... 707/736 |
| 2012/0197834 A1 | 8/2012 | Panigrahy et al. |
| 2012/0209832 A1 | 8/2012 | Neystadt et al. |
| 2012/0221581 A1* | 8/2012 | Narayanan et al. ........... 707/748 |
| 2012/0232998 A1 | 9/2012 | Schoen |
| 2012/0266081 A1 | 10/2012 | Kao |
| 2012/0303703 A1 | 11/2012 | Richter et al. |
| 2012/0317088 A1 | 12/2012 | Pantel et al. |
| 2013/0019262 A1 | 1/2013 | Bhatia et al. |
| 2013/0135314 A1 | 5/2013 | Haggerty et al. |

OTHER PUBLICATIONS

U.S. Appl. No. 13/547,851, filed Jul. 12, 2012.
U.S. Appl. No. 13/225,380, filed Sep. 2, 2011.
U.S. Appl. No. 13/224,138, filed Sep. 1, 2011.
U.S. Appl. No. 13/548,201, filed Jul. 1, 2012.
"Server definition," The Linux Information Project, created May 16, 2005, retrieved Jan. 23, 2013 from http://www.linfo.org/server.html, one page.

* cited by examiner

COMPLETING QUERIES USING TRANSITIVE CLOSURES ON A SOCIAL GRAPH

BACKGROUND OF THE INVENTION

The present invention relates to the field of information management, and more specifically, to providing an information resource where the content is organized using a social graph.

In business, there is an adage: "the right ten minutes in front of the right person is worth more than a year at your desk." This is because it is people that make things happen, and connecting with the right person can give you the resources, access or credibility you may need to advance your business. So, often the questions become who is the right person, how do I get in front of them, and how do I "emotionally connect" with them in the first few minutes so that they take a liking to me, listen to the rest of my presentation, and want to help me.

Answering these questions requires a lot of information. Some example social networks include Facebook™ and LinkedIn™. Trademarks indicated in this patent application are the property of their respective owners. However, these social networks have limited usefulness. For example, there is no social network that caters to the world's most "influential people," in large part because these people generally keep a low profile, do not promote themselves, and generally do not want the general public contacting through electronic means. Even if an influential person has an account on these social networks, they are unlikely to keep their accounts up-to-date with their information. Also, these social networks are not flexible in the kinds of information they store about persons in the system and are unable to process the stored information to generate the kinds of meaningful connections to influential people business persons need.

Therefore, there is a need to provide an information resource that is flexible in the types of information that it stores and offers insight on relationships based on the stored information.

BRIEF SUMMARY OF THE INVENTION

A system gathers information on influential people and builds a social graph. The system is flexible in what types of information it gathers so that a detailed picture on influential persons can be determined. The information is organized to allow users of the system to make fast searches with the system and draw meaningful conclusions from the information.

Additionally, the system allows subscribers (such as people who pay a monthly fee to access to the system through the Internet) to create their own profile. The system can include for example, where they went to school, where they worked, what types of nonprofit interests they have, clubs they belong to, where they grew up, and who they know. In an implementation, this profile is not seen by any other user or subscriber of the system. The profile may be protected and not shown to others unless explicitly granted permission, but allows the system to customize itself to the user. So, if a subscriber pulled up the profile of an important person they would immediately see "who do I know in common with this person" and "what other interests or facts do I share in common with this person." In essence, the system can do the work of telling a user how to get to anyone and what to say to them to bond with the person within a few minutes.

Most executives do some version of this work already. They do Google searches (or have their assistant do it), which returns a very verbose, spotty, incomplete, and unsynthesized view of a person. Then, they have to read it all to try and understand how they might relate to the person. This costs time and money and is very inefficient. The system makes this information available more easily.

In an implementation, a method includes: providing a system including a social graph, where the social graph includes: ghost nodes, where the ghost nodes are created and maintained by users of the system, system-provided nodes, where the system-provided nodes are maintained and updated by the system, and edges connecting the ghost and system-provided nodes; receiving a request to determine whether a first node is connected to a second node stored in the social graph; executing a transitive closure operation on the social graph based on the request; and returning a result on whether the transitive closure operation can be completed.

In various implementations, the method includes where each edge of the edges connect exactly two nodes. the method can include where the edges are stored in a paths database, where the paths database is stored separately from the social graph. The method can include where the returning the result includes a path of nodes and edges connected in the social graph. The method can include where the path is not explicitly stored in the social graph.

The method can include where the first node is a ghost node. The method can include where the first node is connected to a third node by a first ghost edge. The method can include where the third node is separate from the second node. The method can include where the path includes at most two ghost edges. The method can include where each ghost node is connected to at least one system-provided node through a ghost edge. The method can include where the first node is a system-provided node. The method can include where the first node represents a person. The method can include where the first node represents an organization.

In an implementation, a method includes: providing a system including a social graph, where the social graph includes: ghost nodes, where the ghost nodes are created and maintained by users of the system, system-provided nodes, where the system-provided nodes are maintained and updated by the system, and edges connecting the ghost and system-provided nodes; receiving a request to determine whether a first node is connected to a second node stored in the social graph, where the first and second nodes are at least two degrees of separation apart in the social graph; executing a transitive closure operation on the social graph based on the request; and returning a path based on the transitive closure operation, where the path includes nodes connected by edges in the social graph.

The method can include where the path includes at least two nodes representing different entity types. The method can include where the path includes the first and second nodes. The method can include where the request is a user request.

In an implementation, a method includes: providing a system including a social graph, where the social graph includes: ghost nodes, where the ghost nodes are created and maintained by users of the system, system-provided nodes, where system-provided nodes are maintained and updated by the system, and edges connecting the ghost and system-provided nodes; receiving a request to determine whether a first node is connected to a second node stored in the social graph; executing a transitive closure operation on the social graph based on the request; and storing a first-degree connection in the social graph, where the first-degree connection is based on the transitive closure operation. The method can include before the executing a transitive closure operation, determining whether the first and second nodes are connected by one or fewer degrees of separation in the social graph. The method can include where the social graph is implemented in a graph database.

Other objects, features, and advantages of the invention will become apparent upon consideration of the following detailed description and the accompanying drawings, in which like reference designations represent like features throughout the figures.

DETAILED DESCRIPTION OF THE INVENTION

Figure 1:
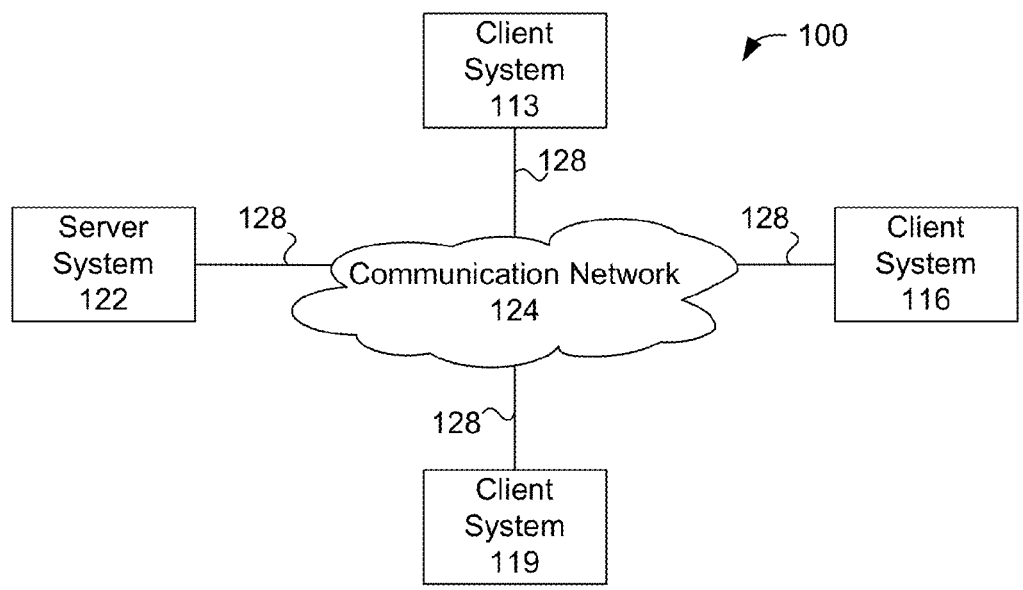
FIG. 1 shows a simplified block diagram of a distributed computer network within which a system of the invention can be implemented.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like. Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser by Microsoft Corporation, the Firefox® browser by Mozilla Foundation, Chrome by Google Inc., WebKit and its variants, or others.

Figure 2:
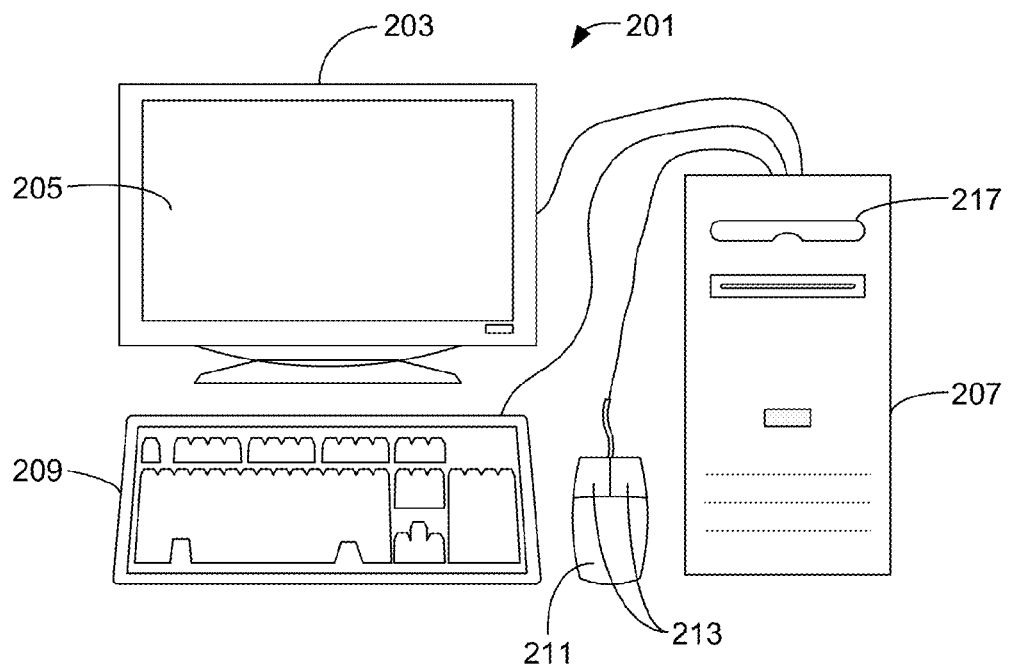
FIG. 2 shows a more detailed diagram of a computer system, client or server, which is used operate with the system.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

The computer system in FIG. 2 is representative of electronic computing systems with a computer processor or central processing unit (CPU). These include servers, desktop computers, workstations, notebook or laptop computers, tablets, nettops, netbooks, smartphones, set-top boxes, media players, and many others. These can also include iPads, iPhones, PDAs, or Android phones.

Figure 3:
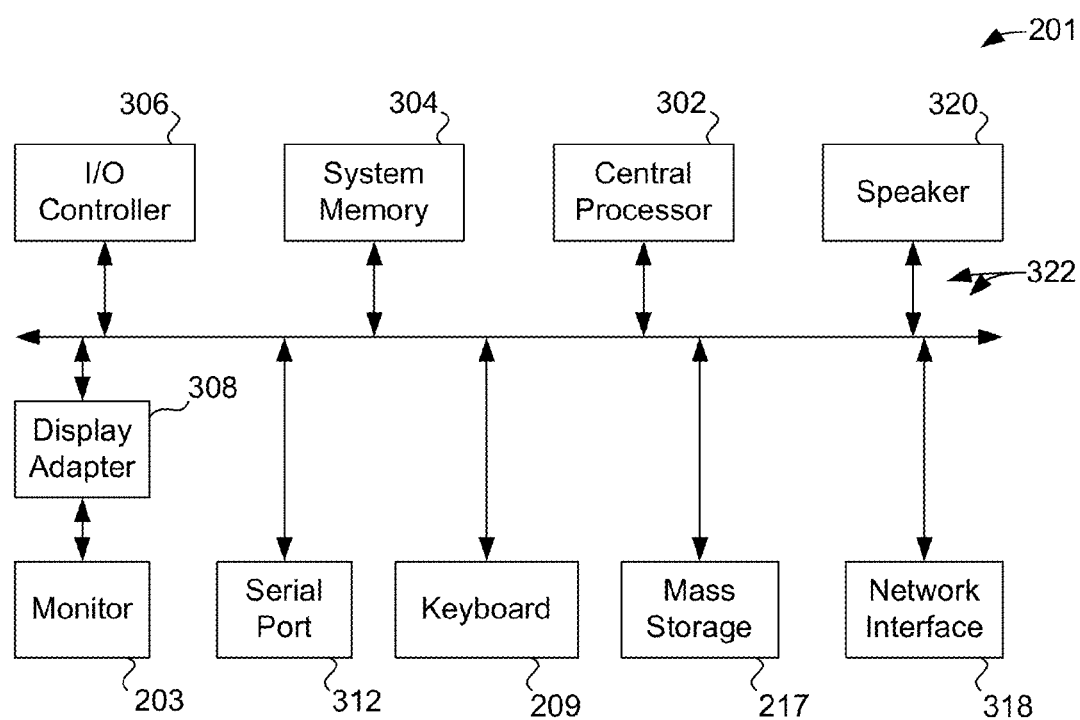
FIG. 3 shows a system block diagram of a computer system used to execute a software implementation of the invention.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64 X2 Dual-Core, AMD Phenom™, Microsoft Xbox 360 central processing unit (CPU), and ARM architecture based processors (e.g., Nvida Tegra2, Qualcomm Snapdragon, Apple A4).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, SQL, dBase, Gremlin, Blueprints, Python, PHP, or Closure. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). An operating system for the system may be one of the Microsoft Windows® family of operating systems (e.g., Windows 95, 98, Me, Windows NT, Windows 2000, Windows XP, Windows Vista, Windows 7, Windows 8, Windows CE), Linux, UNIX, Sun OS, Ubuntu, or Macintosh OS X. Microsoft Windows is a trademark of Microsoft Corporation. Some mobile operating systems that can be used with an implementation of the invention include: Google Android, Chrome OS; Apple iOS4 or iOS5; Blackberry OS; Windows Phone 7.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). Other information transmission standards that can be used in a system of the invention include: Bluetooth, wireless USB, WiMAX, EDGE, EV-DO, GPRS, HSPA, LTE, UMTS, Edge, 2G, 4G, LTE. For example, signals from a computer may be transferred, at least in part, wirelessly to components or other computers.

The system maps the world of influence through a large database, which can be stored in a variety of ways. A specific technique is through a combination of an entity graph and associated SQL database, but other database types may be used. The database is at its core a mapping of entities and relationships between those entities. Note that this can be done with an array of other technologies, all of which can be used to achieve the same result. A technique and implementation of the system scales nearly infinitely to handle all the real-world ways that people know each other and facts about them.

The system product allows the paid user or subscriber to step into the created world and see how they fit in. Moreover it provides them with information that allows them to move further in to this world of influence. The system can also be supported, in part or fully, by advertisements.

This idea of a person being "powerful" is to be described in more detail (e.g., see quantitative discussion below), but in a simple instance you can say President Barack Obama is the most important person in the world, and thus calculate every single person's importance by how well they know him and how many people removed they are (or how many people they know in common with him and how well). In practicality, several "sign posts" can be erected in each industry that allows for this type of sector power ranking to fall out. Also, this can be cut in a different way to show someone's overall power in the world (for instance).

In an implementation, a sign posts algorithm is used by human operators. These human operators can "bump up" a weight of a particular relationship, or entity in the graph.

In an implementation, the sign posts can alter the distribution of energy/influence in a graph based on a mathematical distribution (e.g., Bayesian distribution, Priors algorithm). Sign posts not only bias the centrality algorithm for influence amongst the entire graph, they can also be applied to effect centrality calculations for a particular domain.

Additionally, by means of the weighted path algorithm, the system can show how influential someone is over an organization, creative work, event, or a series of events. The system can calculate the weights between any two nodes in the graph, independent of their type. This can have to do with how closely they are (or have been) affiliated with an organization, but can also be more nuanced. For instance, a person who is very close to three board members (but himself is not a board member) may be (or possibly could be) a key influencer of that organization. Influence is also transitive, for example: (1) CEO X controls Company Y, which in term owns a controlling stake in company Z; (2) X has transitive power over the CEO of company Z; and (3) CEO W controls company X, which in term owns a controlling stake in Company Y. We can determine that CEO of Company Y, CEO Z is very influenced by CEO W.

The system uses technology to collect this data, including pioneering innovative collection techniques (e.g., Internet, crawling, and filtering). Additionally, there can be a large team of people who "clean" this data. Given that the system is serving a very high-end clientele, the service needs to have very clean and precise data, which the human factor helps achieve.

Figure 4:
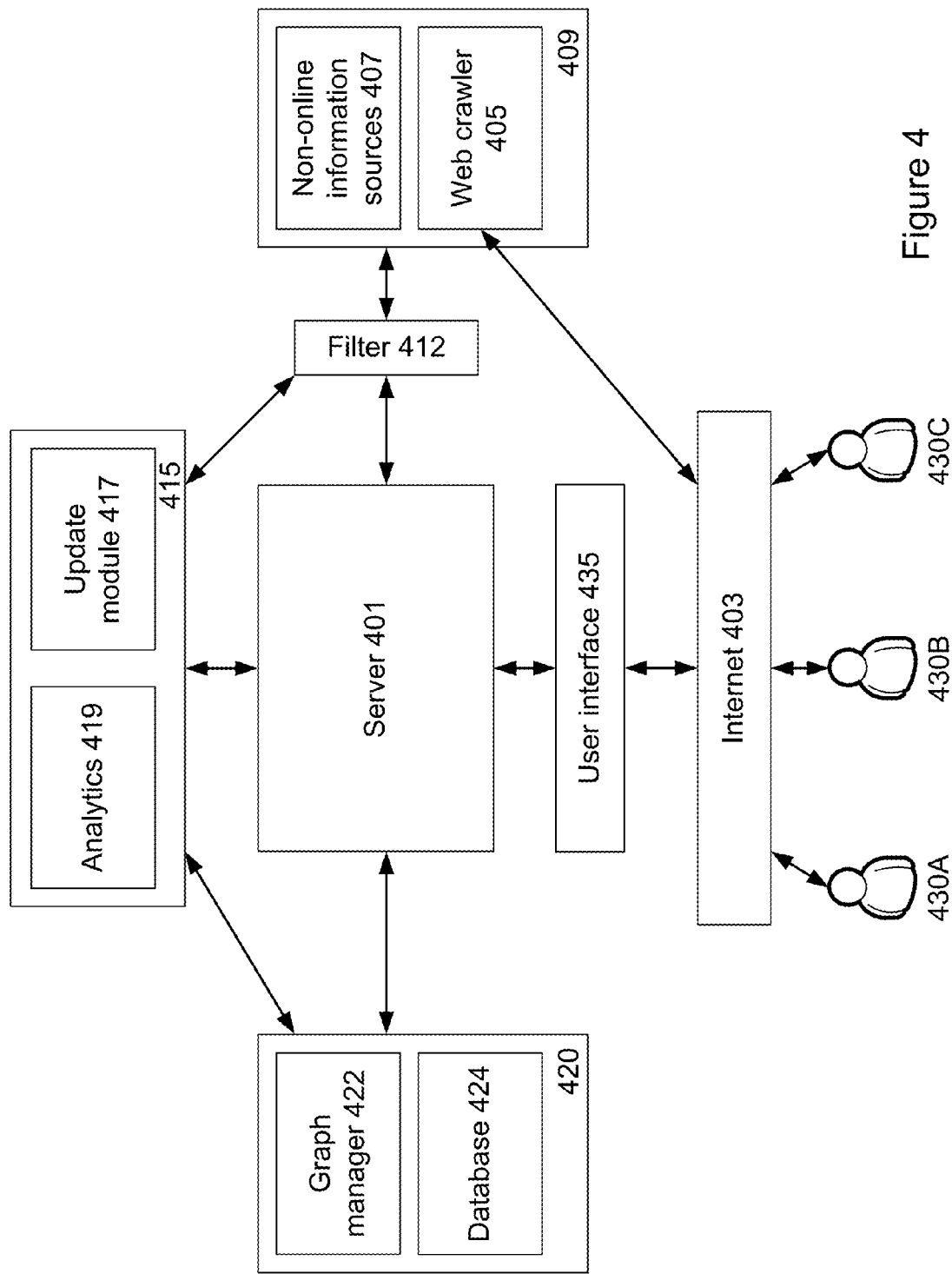
FIG. 4 shows a system diagram.

FIG. 4 shows a block diagram of an implementation of a system of the invention. The system gathers information on entities, people or organizations, from on-line and off-line sources. The information is organized using a social graph (having nodes and edges), so that social relationships between the information can be more easily determined. The system provides this information, organized by social graph, as an information resource service to users. Users can use the system as a tool to identify and make better connections to other people or organizations. In a social graph of the system, entities of the social graph are connected by a variety of different edges representing different relationships between the entities. The information in the social graph is non-hierarchical (e.g., not organized as a tree). This means that, although one relationship may be more important than another similar relationship (e.g., a relationship of CEO to a company and another employee type to the company, a financial relationship where one is a greater economic value, or other types of relationships) the relationships are represented in the social graph similarly, without regard to ranking the weight of the relationship.

In an implementation, a server 401, having hardware such as described above, executes and stores software and data of the system. The server receives information from an information gathering module 409, which can be take information from on-line or non-on-line (or off-line) sources, or both.

For on-line sources, a crawler module can be used. Via the Internet 403, a crawler module 405 (e.g., Web crawler) gathers information for the system from on-line source and sends the collected information to the server. These on-line sources include Web pages and other unstructured information data sources.

The crawler module is a computer program that browses a network such as the Web or Internet in a methodical, automated manner in orderly fashion to gather desired information. The crawler can be embodied as ants, automatic indexers, Web crawlers, Web spiders, or Web robots. The sites the crawler retrieves information from can include public and closed sources. Some examples of closed sources include membership, closed-networks, and pay information services such as LexisNexis®, which is a registered trademark of LexisNexis.

For off-line sources 407, a research team can find relevant information and then put the information into electronic form for further handling by the system. Such off-line sources can include print (e.g., yellow pages, white pages, school yearbooks, old papers records that have not been put into electronic form) and other sources which are not available online. Some of these sources may be newspapers from countries other than the U.S. that do not have an on-line counterpart. Therefore, some of these sources may not be in English, and will be translated as needed (either by a translator (person) or by way of a machine translation) into English for inclusion into the system.

In an implementation, the information gathered (whether on-line or not on-line) is related to an entity, specific person or organization. The person or organization is one that the system tracks for its users. For example, the information may include all activities and news related to the specific person being tracked. These may include news about the person, stock purchases and sales, appearances as events, relationships with others, lawsuits, travel, identification of family members, new family members, contributions or donations to organizations, promotions, demotions, company changes, retirement, and others.

This information from information gathering module 409 is filtered by a filter module 412. The filter module 412 "cleans" the information by identifying the information relevant to the system, and discarding (e.g., removing or redacting) information that is not relevant or is of low relevance to the system. The filtering module may present a report of the proposed filtering to a person for approval or modification before being published live on the system.

After filtering, the information is transferred to an information processing block 415, which includes an update module 417 and analytics module 419. Update module 417 handles determining whether information in the system should be updated, since some of the information may be duplicative or not current. For information to be added to the system, the update module will handle performing updates (or request another module to do the update).

In the case the information is for a person already having a node in the social graph managed by the system, that node is updated. This node is a system-provided node because it is generated by the system, and not one which was created for or by a user or member of the system.

In the case the information is for a person that does not yet have a node, the update module will create the node (as a system-provided node) and create edges for the node as appropriate to link the new node to other system-provided nodes. Edges created by the system between the system-provided nodes are referred to as system-created edges.

Typically, the crawler module continually searches on-line sources for new information. It is desirable that an updates occur in real-time or soon as practicable, so that the information service offers timely information for its users or customers (e.g., 430A, 430B, and 430C). For any new information found, the update module updates the social graph of the system.

The analytics module 419 performs analytics on the information of the system, such as calculating influence index values for each node and other metrics based on the social graph. The analytics modules uses algorithms, and the resulting metrics (e.g., influence or power ranking) can be continually update as the nodes are updated. For example, analytics include calculating or updating a influence index value (or power ranking) for a person. Analytics is described further in U.S. provisional patent application 61/507,106, filed Jul. 12, 2011, which is incorporated by reference.

Another feature of the system is to allow users to set-up watches on people being tracked by the system. Then when users log into the system, their home page will show updates and new news on the watched people since they last time they logged in. E-mail or other messages (e.g., SMS) can be sent to the users to alert users of new news for the watched people.

The system stores information, including the social graph, in a storage block 420. This storage block may be implemented using hard drives of the server or across multiple servers (or network-attached storage (NAS) drives). Storage module 420 includes a graph manager 422 and a database 424 module.

The graph manager module manages the social graph of the system, adding, modifying, updating, or deleting information, nodes, and edges of the system. The social graph can be stored in a database structure. Each entry in the database can represent a node and include links, representing edges, to other entries or nodes. Other computer data structures can be used to implement a social graph of the system, including queues, stacks, pointers, arrays, linked lists, singly linked lists, doubly linked lists, and others, in any combination.

As example of graph manager operation, if a graph contains information about a person who is the chief executive officer (CEO) for a company A, but the person has resigned, the graph manager will update the CEO's system provided node to reflect the new information. The relationship of that person with company A may be removed or altered to show that the person is no longer company A's CEO. Also, information that was not previously in a graph can be added. For example, if the person from the previous example resigned from company A to take the CEO position for company B, the graph is updated to reflect this change. The system stores its information in the database, which can be access by the users of the system to see the updates.

The information of the system is provided as a service to users or subscribers 430A, 430B, and 430C. The users can pay a periodic charge (e.g., month, yearly, or other time period). The users can pay per use (e.g., a charge per search). The users can use the system for free, where the system is, e.g., ad supported or supported by revenue from other sources besides user fees. The system can have also have modules (not shown) for generating revenue by any one or combination of these revenue models.

In an implementation, the system has a Web interface so users can access the system via an Web browser at a client device. The client may be a mobile device such as a smartphone or tablet computer. Depending on what type of device the user 430A-430C is using, the user interface module 435 prepares and transmits a version (e.g., HTML or XML) suitable to the user's device. Also, the user interface module 435 prepares and selects what information to present. The system may have other interfaces, which can be used instead of or in combination with the Web interface, such as a dedicated application or app to connect to the service.

As discussed, the system organizes information about people or organizations using a social graph. By organizing information using a social graph, this can make it easier for viewers who access the information to determine the relationships and connections between the people (nodes) in the social graph. Using the social graph structure, a user can determine the degrees of separation between the nodes in the graph. A node can have any number of degrees of separation, one, two, three, four, five, six, seven, eight, nine, ten, or more. Generally, the more degrees of a separation one node is from another, the less strong the relationship is between those two nodes which represent two people. For example, the user can specify in a search term a number of degrees of separation in which to limit the search (e.g., search for two degrees or less) from a particular person, so that less strong connections can be omitted from the search results.

For a social graph, one degree of separation between two nodes means that the two nodes are connected via a single edge. Two degrees of separation between two nodes means that the two nodes are connected via two edges (passing through another node). Three degrees of separation between two nodes means that the two nodes are connected via three edges (passing through two other node). Therefore, n degrees of separation between two nodes means that the two nodes are connected via n edges (passing through n−1 other nodes).

Compared to, e.g., an HTML page or other data structure giving information on an individual, the social graph structure gives additional relationship information, which is very valuable in the context of a person trying to make relationship connections. With a social graph structure, an information page for a person of interest (person A), the user can see the people connected by a first-degree connection to person A. The person can connect via a link on person A's page to see another person, person B, who has a one-degree connection to person A. On the page for person B, the user will see all the one-degree connected people to person B, which includes person A.

With an HTML page, the relationship information is not inherent in the HTML structure. In fact, once one follows a link from one HTML page to another, the next HTML does not necessarily include a link back to the referring page. Information is lost when traversing from page to page. A social graph structure does not have this problem.

Although there can be any number of degrees of separation in a social graph, the system can allow the user to configure searches, calculations, and other operations to limit the numbers of degree of separate to a certain value m, an integer 1 or greater. By limiting the m, this can increase the speed of the system, since less information or nodes need to be considered. The user may want to leverage stronger relationships first, and such a user-configurable setting allows this.

As a further aspect of the system, after a user signs up and becomes a member or customer of the system. The system creates a node for the user, which is a ghost node in the system graph. This is in contrast to a system-provided node which is a node created by the system. Ghost nodes of the system are created for users of the system. Connections between ghost nodes and other nodes (e.g., system-provided nodes) are through ghost edges. A ghost node and its ghost edges is visible only to the user, and not others users of the system.

For the ghost node, the system allows the user to input information on the user. For example, this information can include people the users know, activities the user participates in, education of the user, and others information about the user. This user-input information can help the system identify connections to the system-provided nodes (people being tracked by the system). In an implementation, ghost nodes representing other users are invisible to users of the system. This can be done, for example, through encrypting ghost nodes of the system, which prevents users from accessing information on selected nodes (e.g., ghost nodes).

The user can then tag people the user knows, organizations the user is affiliated with, and things the user likes. The more relationships the user adds the more they become plugged into the sphere of influence. Given the information provided by the user, the application runs weighted path algorithms in order to show the user to whom they are connected and how.

The system does not allow the activity of this ghost node to effect the way information is generated for other users. Since the information added by the user is applicable to that one person, this node is treated as a "ghost node." Any calculation that hits this part of the graph for any other user, realizes this is a ghost node, and the traversing at that part of the graph dies.

So, the system allows a person to enter ("virtually") into the graph for the user's own use, morphing and defining it for the user's own purpose without impacting other users, or the general makeup of the system's data. The ghost node will not interact or interfere with other ghost nodes for other users of the system.

Figure 5:
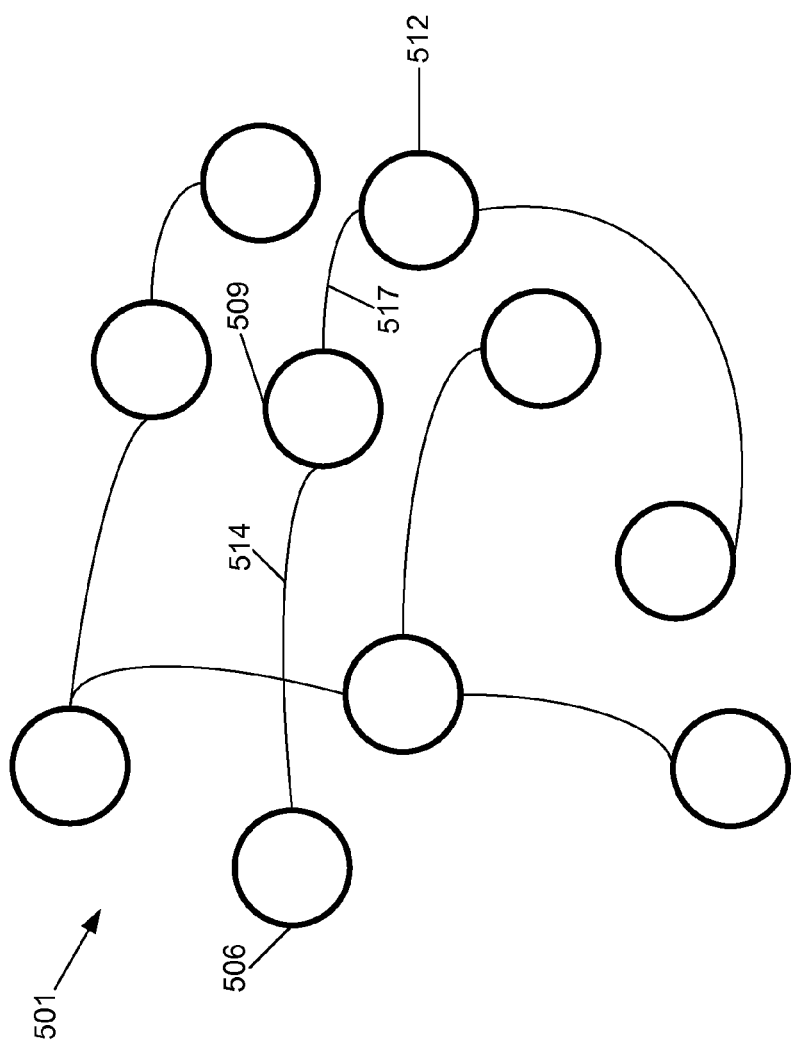
FIG. 5 shows a social graph with system-provided nodes connected by system-provided edges.

FIGS. 5-9 show a sample social graph of information for a system of the invention. FIG. 5 shows a sample master graph 501. This graph is maintained by graph manager 422 of the system. The nodes or circles (e.g., 506, 509, and 512) represent entities (people or organizations), and an edge or line (e.g., 514 and 517) between two nodes represent a connection between the two entities. In an implementation, the nodes can represent any entity (e.g., organization, people, organizations, creative works, events, products, awards, places, groups).

Nodes 506, 509, and 512 are system-provided nodes. Node 506 has a one-degree connection through edge 514 to node 509. Node 506 has a two-degree connection through edges 514 and 517 to node 512. Node 509 has one-degree connections to both nodes 506 and 512, through edges 514 and 517.

Figure 6:
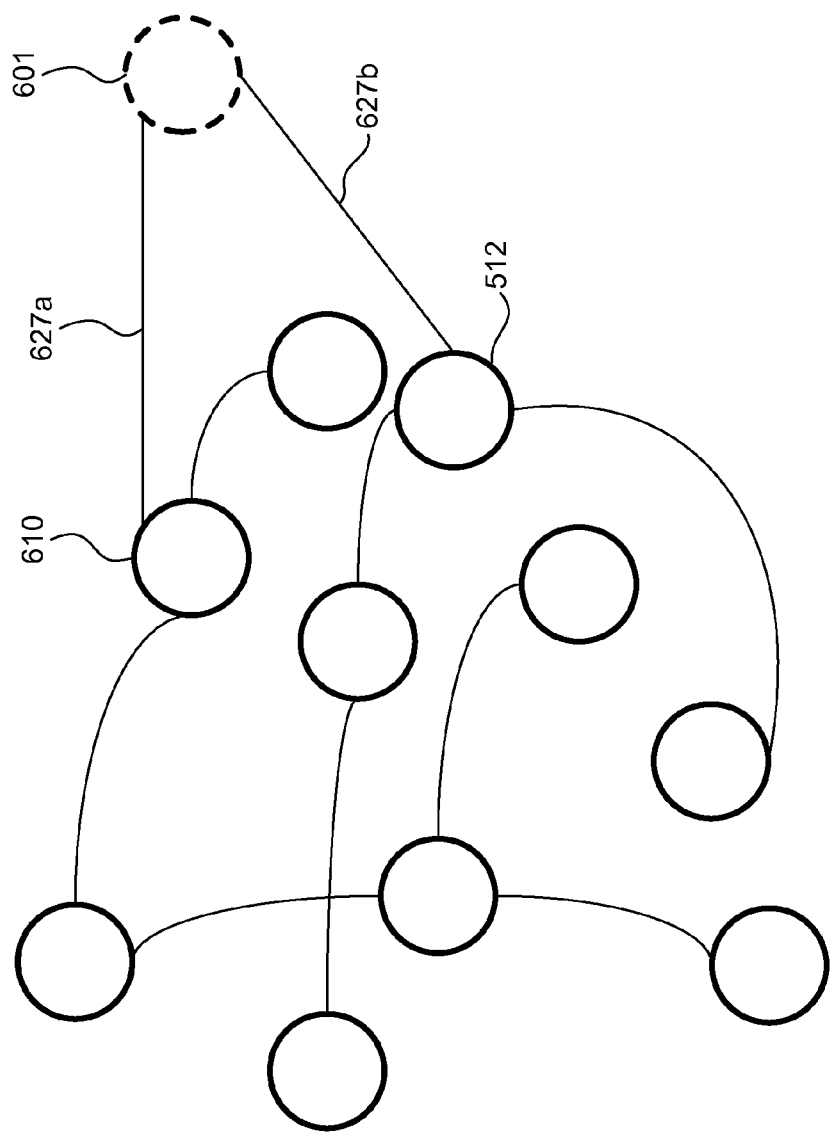
FIG. 6 shows the addition of a first user as a ghost node with ghost edges to the social graph.

FIG. 6 shows a first user being added as a ghost node 601 to graph 501. Node 601 is shown in broken lines. This first user 601 can be representative of a subscriber (e.g., ghost node) in the system, while the other nodes in solid lines are representative of a system-provided person or entity. The first user 601 adds information on connections they have in the system. For example, the first user in FIG. 6 is associated or affiliated with two persons 610 and 512 in the master graph, as represented by the two ghost edges 627a and 627b.

Figure 7:
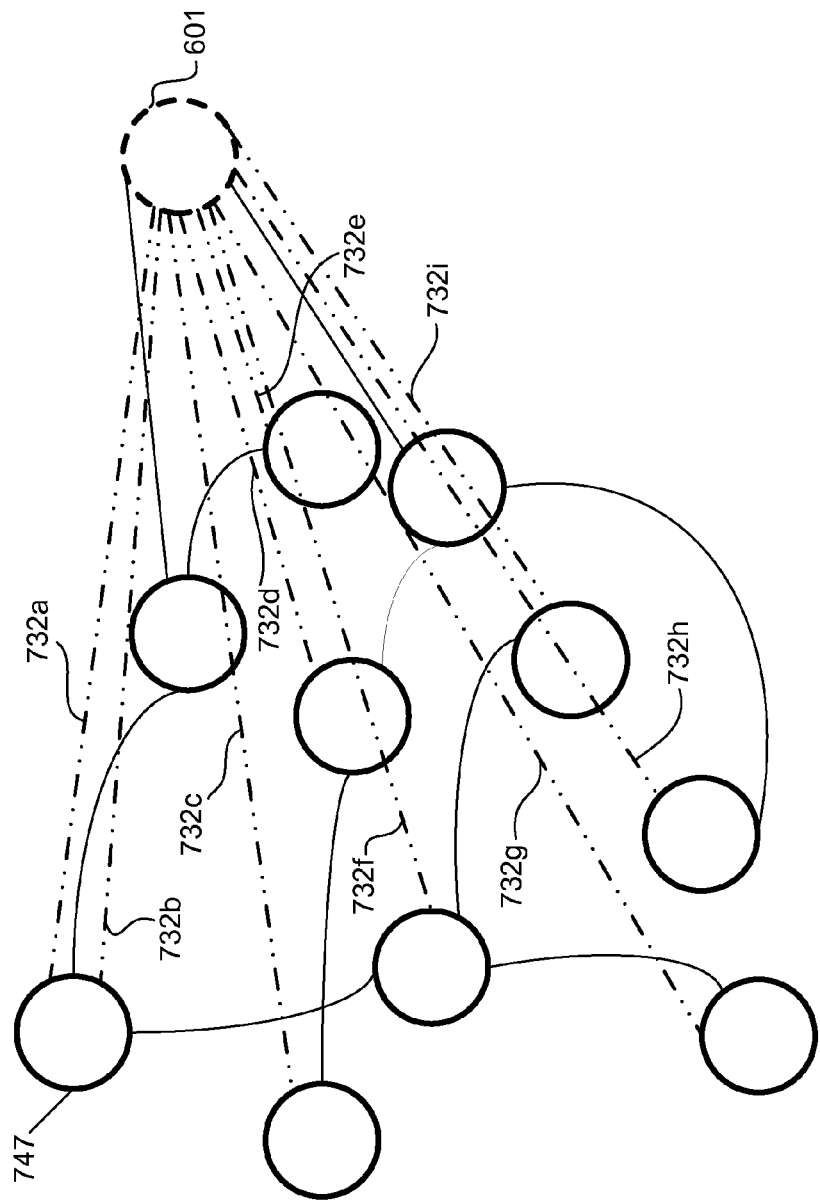
FIG. 7 shows connections the first user can make to system-provided nodes of the social graph.

FIG. 7 shows relationships ghost node 601 has with other nodes of graph 501. Node 601 has first-degree connections to nodes 610 and 512 (see FIG. 6). The relationships are represented by connections 732a-732i (not shown in FIG. 6) are of varying degrees of separation, greater than one. Node 601 has n degrees of separation with these nodes, where n is a number of edges (ghost edges and system-provided edges) that exist between the nodes to be traversed. For example, node 601 has a two-degree connection to a system-provided node 747, passing through one ghost edge and one system-provided edge.

Greater than one-degree connections are the connections that the first user does not have directly (e.g., first degree of separation or one step), but has through additional people or nodes. With the information in social graph from, the first user can trace how this connection or route is established.

Figure 8:
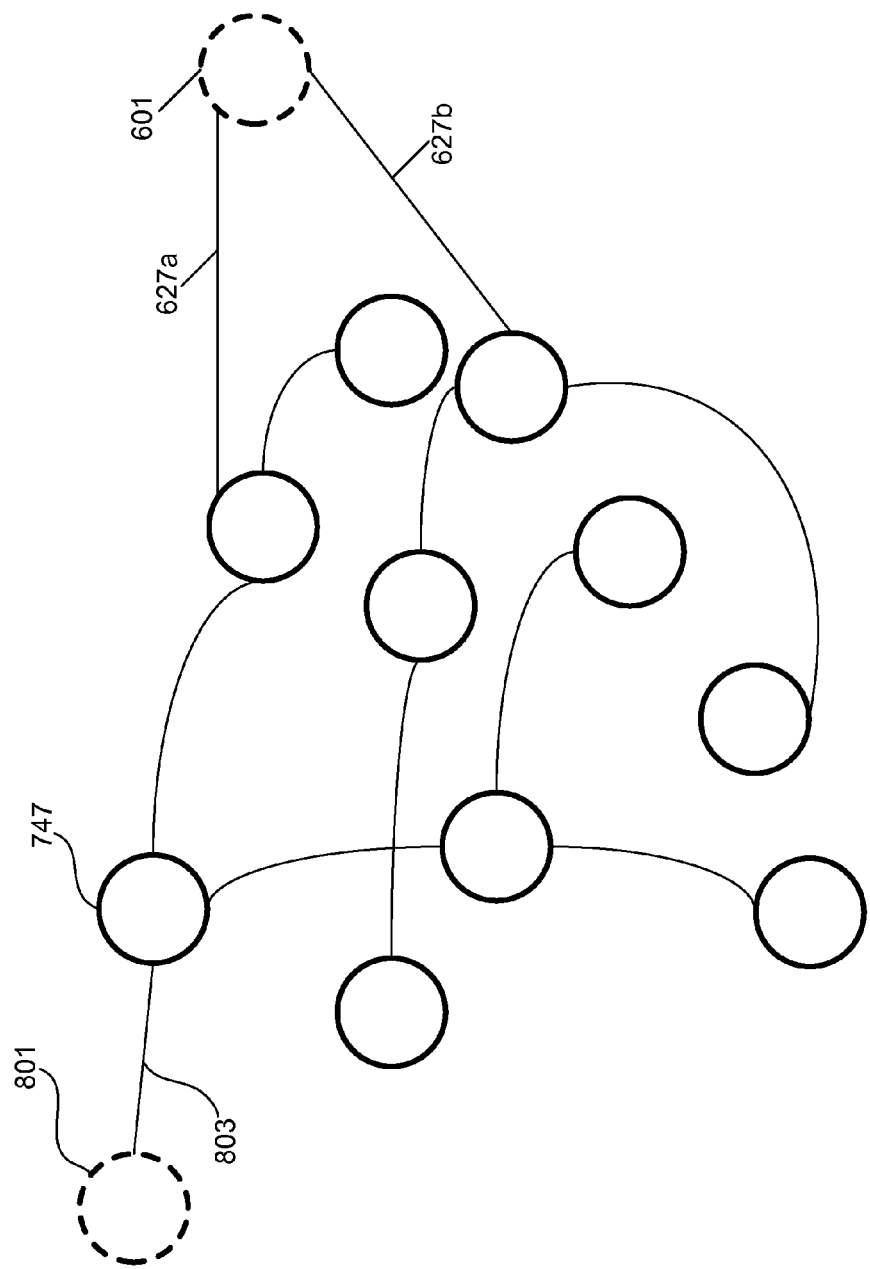
FIG. 8 shows the addition of a second user as another ghost node with a ghost edge to the social graph.

FIG. 8 shows a ghost node 801 for a second user 801 being added to graph 501. Node 801 is shown in broken lines. This second user has a single connection through a ghost edge 803 to node 747. The second user is able to see the connections in the curated system, but will not be able to traverse through a ghost edge or ghost node, or to see information on any other ghost nodes or ghost edges. In particular, node 601 and edge 627a and 627b will not be visible or accessible to the second user.

Figure 9:
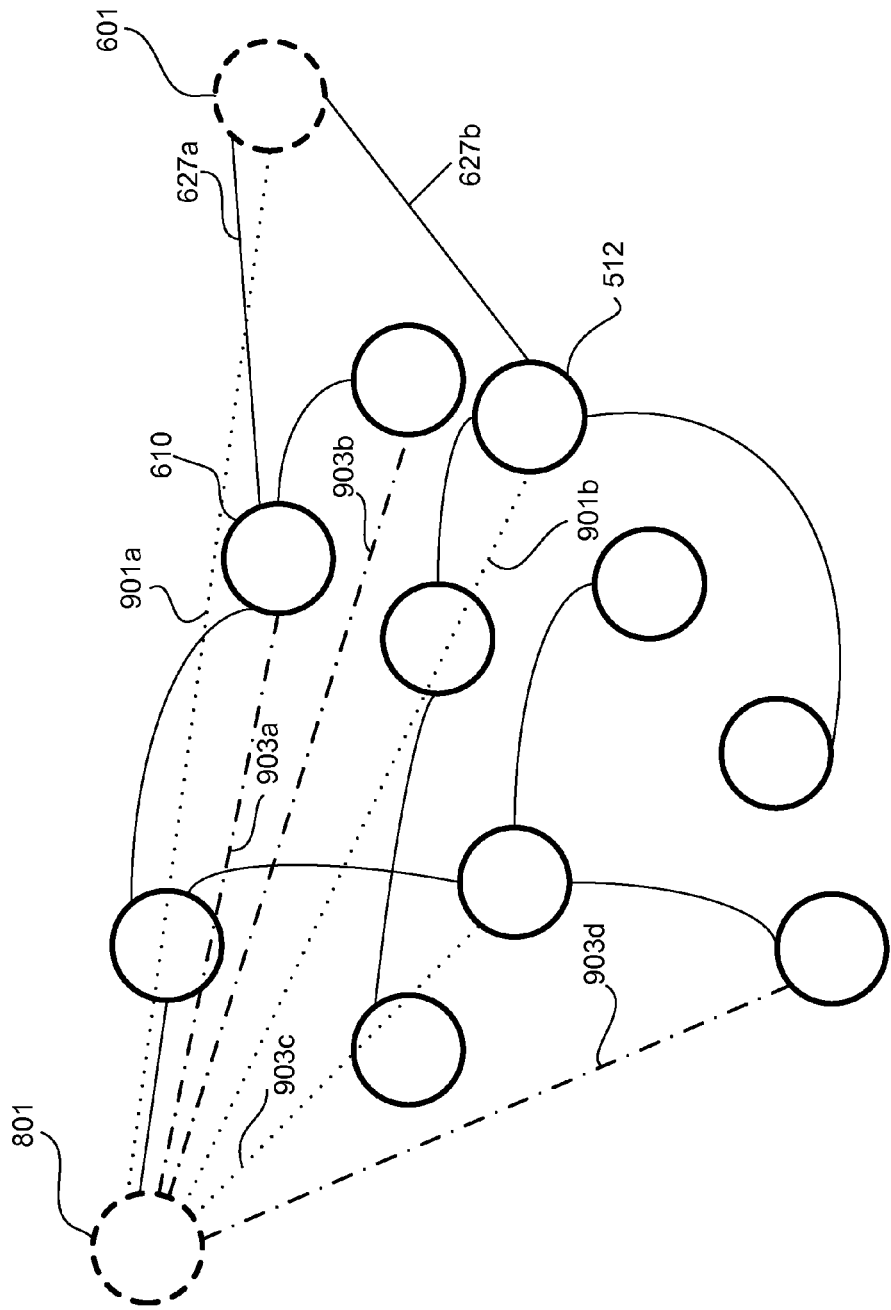
FIG. 9 shows connections the second user can make to system-provided nodes of the social nodes, and the first user's ghost node and edges are not available to the second user.

FIG. 9 shows a connection 901a between node 601 and node 801, as well as a connection 901b from node 801 to node 512. The second user 801 is also connected by edges 903a, 903b, 903c, and 903d to various nodes that are two or more degrees of separation from the second node 801. Connections 901a and 901b are shown using a dotted line. System provided nodes may be connected via ghost nodes and ghost edges. In this figure, nodes 610 and 512 are connected by ghost node 601.

However, in an implementation of a system of the invention, users of the system (e.g., represented by ghost node 801) will not be able to see connections between system-provided nodes (e.g., 610 and 512) that are due to ghost nodes (e.g., 601) and ghost edges (e.g., 627a and 627b) of other users.

Therefore, in the graph this figure, the second user (i.e., node 801) has no connection to system-provided node 610. To reach node 610, the two ghost edges to the first user 601 would need to be traversed, which an implementation of the system does not allow.

In other implementations, a ghost node (e.g., super ghost node) can make traversals through other ghost edges and ghost nodes to make a connection to other system-provided nodes. This can occur when two users share contacts and connections between each other. So, in this example, when first user 601 and second user 801 share connections (or part of the same entity or company), both gain additional connections (e.g., n-degree, n-step connections). For example, the second user gains a connection to node 610 through the route 901a to 627a.

In an implementation, the system can have a limit for a number of degrees (i.e., d) for displaying or considering connections. As discuss, as the number of degrees increases, the strength of the connection or relationship between two nodes diminishes. Also, processing power by the system increases as d increases since many more nodes and edges are to be considered. Therefore, the limit for the number of degrees, d, can be system defined or user defined (discussed above). For example, d can be 2, 3, 4, 5, 6, 7, 8, 9, or another integer. Then, when requested to show the list of connected nodes, the report listing will show nodes restricted to within the degrees of separation as specified by the d value.

In an implementation, the graph database of the system has nodes (representing entities) and edges (representing relationships). The entities and relationships can have any number of properties. Each property for a particular entity or relationship, also has a value. Additionally the edges are directional, so that each edge implies an incoming and an outgoing node. The relationship one node has over another is different can have different meaning, but the one relationship is represented as one explicit fact. Nodes (or vertices) and edges also have weights (or rankings) that is determined by the type or category.

Some specific flows for determining a technique of the invention are presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In an implementation, every piece of information is attributed with a "type." The type system is our ontology as information is broken down into a few major categories that organize different types of data. Entity Types classify each entity, or node in the graph at the top level. In an implementation, entity types include: People, Organizations, Creative Works, Events, Products, Awards, Places, and Transactions. Each Entity in the system can be categorized at very granular levels, and have multiple classifications, however, each entity must have exactly one top level type. Further information on these entity types follow:

(1) People. These are the natural persons in the system. Many of the other entities relate to one or more people in the system.

(2) Organization. For example, these are companies, non-profits, associations, fraternities, or others.

(3) Events. The system can track event such as business transactions, conferences, parties, award ceremonies, or others. These events can have influential or important persons in attendance.

(4) Creative Works. Creative works are films, TV shows, paintings, books, or others. These entities are important because they create additional connections between entities.

(5) Awards. Awards can be creative work awards, ranked lists, hall of frame memberships, Honorary Degrees, or others. Awards can be given to people, organizations, and creative works. These are usually given (or granted) by an organization.

(6) Products. Products are produced by companies. Products can be dealt with both on an abstract level (where one entity represents the product), or on a per instance level. Stocks issued by a company, both public and private types of stock, are dealt with as products.

(7) Places. Places are a special type of entity in that these entities must be defined in geo-spatial terms. Places can be both administrative regions (e.g., cities, states, countries) as well as points or physical places (e.g., restaurants, museums, offices)

(8) Transactions. Transactions are ownership events that involve two or more companies, and any number of people.

In an implementation, an organization is a collection of multiple people. These people can be also be represented as nodes, separate from the organization. For example, company A has a CEO who is person B. Company A can be represented as a company node, while person B can be represented as a person node. Person B will also be connected to company A. A benefit of using organizations is that it helps the system arrange its data and possibly decrease the amount of nodes in the system. For example, some organization can have many members or people. Using the example given previously, if there is a person C who is an entry-level associate at company A, the system does not need to create a person node to represent them. Instead, person C can be associated with the organization without a separate person node. This simplifies and reduces the information the system needs to store. Also, grouping by organizations assists a user of the system in making searches by allowing powerful queries based on an organization. For example, the system can tell a user not only who is in an organization, but whether another person is associated with the organization. For example, for a popular golf club (an organization), the user can find out not only who is a member of the club, but others associated with the club (e.g., people who make donations to the club, is a spouse of a member of the club). This allows the user to quickly expand their connections, by asking who is connected to an organization.

In an implementation, each entity can have [n] number of classifications. Entity classifications describe and categorize entities at a granular level. For example, Bill Gates is an {Entrepreneur}, {Technologist} and {Philanthropist}. Entity classifications are stored in a tree structure, the root of the tree converges at the master entity types, as discussed above.

In an implementation, a 0-1 Score of a particular entity's influence over another is calculated on the fly with our weighted path algorithm, as discussed in further detail below. This score may be the result of a function based on: (1) Predicate (Type of Relationship); (2) Time (e.g., Recency, Length of time); (3) Amount of Incoming links of the same predicate, or (4) An array of Attribute value pairs are based on the system's ontology and can modify the weight-in/weight-out of the edge. This includes all of the paths throughout the graph that link those two entities together.

In another implementation, the ontology of the system is represented by two separate Ontologies which are referenced throughout the system's data set in a number of concepts. These type systems are, for example, Concepts Graph, and Type System. The Type System is represented by six separate graphs which have different applications and different significance: Entity Classifications, Entity Attributes, Relationship Types (e.g., Edge Labels), and Relationship Attributes, Entity Attribute Values, Relationship Attribute Values. Entities are categorized in the "Entity Classifications" partition of the type system. Each value in the entity classification can be linked to any entity in the graph via the "Type Of" Edge. Each vertex in the graph will be linked to at least one classification.

In an implementation, the system links interests as concepts in the concepts ontology. This allows us to connect people having similar interests while not having the exact same interest. For example, we could connect the node for "Biking" to the node of "Running" with a "Related Interest" edge.

In an implementation, the direction of a particular relationship type or edge label is defined in the "Relationship Types" system. A directed edge has a name and an inverse name, and different values for the default in/out weights. A bi directional edge has a NULL inverse name and has the same value for weight-in/weight-out. Some relationships, such as a friendship, has no direction, since there are no inverses. A direction is useful for representing other relationships, such as a father or employee, since directed relationships have are inverses. A fixed weight is used to calculate all relationships of a specific type. A fixed weight is associated with the inverse relationship (if is directed).

In an implementation, influence is determined in two ways by two master algorithms. These algorithms determine the influence that two entities in the graph have over each other and one entity's influence in the world. This includes:

1. A person's influence in the world (their centrality in the graph).
2. A person's influence over a particular person.
3. A person's influence in a particular sector.
4. A person's influence over other types of entities (e.g., person, organization, creative work, field of study).
5. A person's influence over a concept (e.g., the most influential people in Mathematics).

In an implementation, a centrality algorithm is used. The centrality algorithm determines a person's overall influence in the world, which is a function of their influence over the people they know, and how powerful those people are. The more powerful people (quantity and quality) you know (the better), the more powerful you are. The more powerful those people are, the more powerful you are. The more powerful people the user knows, the more powerful those people are, and the closer the user knows those people, the more powerful you are.

In yet another implementation, the centrality algorithm uses sign posts. This is a sort of bias on the centrality algorithm to operate with the assumption that this entity has a higher or lower weight then it would usually have if the algorithm were to be run with no bias. When the weight of one entity starts off with a bias, it effects the weights of all other entities and ripples through the entire graph. In order to ground the weighting mechanism of the system, and to get started in calculating influence, the system uses some Educated guesses (e.g., initial values) for some people. Having that weight allows us to calculate the weights of the entities surrounding them in the graph. Sign posts are not only used to bias the overall influence on one person in the master graph, they can also be used to bias their influence in a sector (or concept). In an implementation, sign posts are used in a concept by attaching edges from relevant nodes to a concept node. A bias can be applied to a node connected to the concept. Once the bias is applied, the effects of the bias can propagate through to other nodes connected to the concept (e.g., adding weights to edges connected to the concept).

For example, providing President Barack Obama an influence of 1.0. It is fair to say that anyone who has influence over President Obama, has influence in the world. Since we know this weight, we can start to calculate the influence of the people that surround him and others by how closely they are associated with him. See further discussion of signposts elsewhere in the application.

The system calculates the distribution of energy (or weight) in the graph but instead of having each node start with the same value, the system staggers it by hard coding influence metrics for a particular set of entities. This allows the function to feed off of itself.

In an implementation, weighted path algorithms are used to determine influence. For example, person-to-person influence can be determined according to: a particular relationship type (a predefined constant); the amount of direct and indirect relationships between two nodes; the influence of those incoming and outgoing links and time (duration and recency). In a simple form of the weighted path algorithm, two people who are on the subcommittees of the board for two public companies boards (e.g., small groups that are important and meet often) for the last five years (such that they have many meetings and discussions over time) have a stronger relationship that two people that were on a large (50 person) nonprofit board 10 years ago.

In yet another implementation, a person's influence over a non person entity can be determined. This non-person entity can vary from a company to a film. Influence is calculated per instance based on, for example, relationship type (e.g., Board Member), time, size of company, or others with influence. Additionally, there is the concept of influence over others with influence over the organization).

In an implementation to gather overall influence of a person, the summation (a simplified version of the function used as an example) of the relationship instances or paths between two nodes is calculated. Meaning if someone is the founder, and the CEO, those two different relationships have different weights independently. The summation of these two relationships, or edges, gives us the overall influence that one entity has over another.

In an implementation, an entity can have pass through (or indirect) influence to another entity. An example is that a person who has influence over Obama means that person is influential in the world. Another example is a private equity executive's influence over one of the firm's portfolio companies. In a specific example, Phoebe Phillips is the CEO of Hoode Partners she has a certain Influence over the firm. Since Hoode Partners owns a portion of CeeCee's Shoes Hoode Partners has influence over CeeCee's Shoes as well as the CEO of the company. This means that Phoebe Phillips has some quantifiable influence over CeeCee's Shoes. This is transitive (or pass through) influence.

In another example, consider the following relationships: Dave is Chris' friend and Dave is Chris' boss. Dave has a certain amount of influence over Chris, and Chris has a certain amount of influence over Dave (albeit less). In the first relationship, the relationship has no direction, that is "friend" means the same thing if you where to swap out Dave and Chris in that sentence. In the second relationship, the relationship implies a particular direction. The same predicate (or relationship type) is not the same when the entities are swapped. The system uses the direction of a relationship to derive influence metrics. Other metrics includes size of the group, length, seriousness (board subcommittee for instance), recency, and duration. This can be extended to companies. A CEO has a certain amount of influence over a company, and most certainly the company has influence over him.

In an implementation, the weighted path algorithm calculates the weighted paths between two nodes. Those two nodes could be the combination of any two types of node that exists in the ontology. For example, these can be:

(1) [Person]-to-[Person],
(2) [Person]-to-[Organization],
(3) [Person]-to-[Industry], or
(4) [Person]-to-[Concept].

In an implementation, one user's node is a ghost to every other node in the system. Thus, a piece of data added by a user will have no relevance to another user. However, for groups of users, say a small venture capital firm, the system allows a group of people to enter their contacts that are shared. This means that instead of just one node being the center of the universe for a user, the group of people in the firm are at the center. The value of the product increases tremendously by this sharing because it allows the users to plug-in to the database with a larger core. By interacting with friends and colleagues the connection possibilities increase dramatically. The application has generated a set of distinct paths for two users, and by sharing contacts, now each user can see, and interact with each other's path to power.

Figure 10:
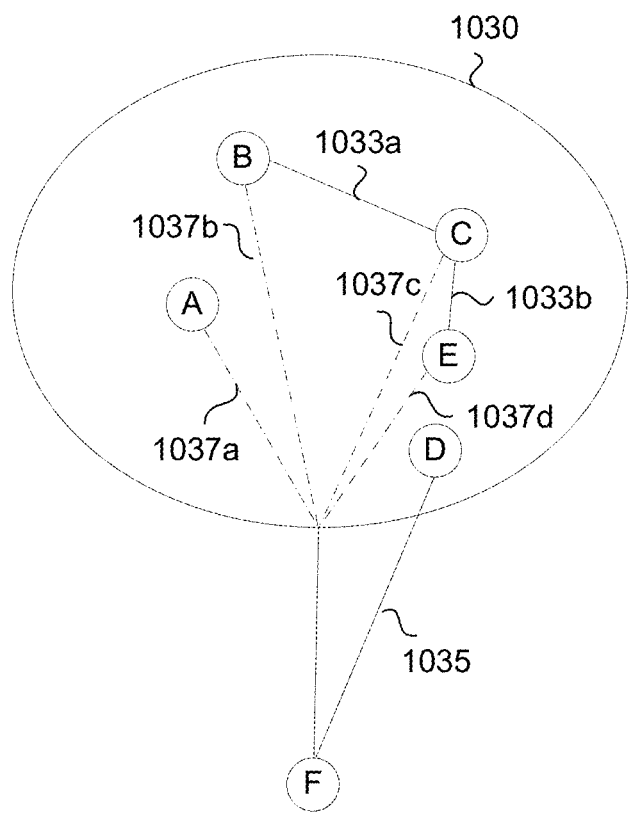
FIG. 10 shows sharing links in an organization.

FIG. 10 shows sharing links in a sample organization (or group). The organization 1030 has members A, B, C, D, and E. In the organization 1030, member C is connected to member B by link 1033a and member E by link 1033b. Although part of the same organization 1030, member A and D and not connected to the other members of the organization (e.g., B, C, E). However, member D is connected to an entity F by link 1035. This entity F is not a member of the organization 1030. Thus, members A, B, C, and E gain a connection to F by links 1037a, 1037b, 1037c, and 1037d. These can be first or second degree connections. For example, link 1037a is a first connection from A to F or a second degree connection from A to the organization 1030 to F.

In an implementation, some nodes of the system are system-provided nodes. These nodes and their connections are created and updated by the system. Other persons (e.g., users or subscribers) do not create these nodes. In an implementation, administrators of the system update and provide the nodes. These administrators are persons trusted by the system to create and curate the data, so that there is a high level of quality (e.g., accuracy of data, timeliness of data) for information stored in the system. In an implementation, none of the administrators of the system are represented as a system-provided node.

In another implementation, a system-provided node is a node created by a person other than the person represented by the node. For example, if Person A is a person represented by a system-provided node, a person other than Person A creates the node. In another example, where an Organization A is represented by a system-provided node, a person who is not a member of Organization A creates the node. In an implementation, the user is denied access to editing a system-provided node.

In an implementation, a person who is represented by a system-provided node is prevented from editing the system-provided node representing themselves. In another implementation, a person who is represented by a system-provided node is allowed to edit a user node representing themselves.

In an implementation, each system-provided node has at least one connection (or edge). For example, each person node will be connected to at least one other node (e.g., another person, organization, entity). This is because system-provided nodes represent persons or entities with influence, and influence is determined in reference to two things (e.g., influence of one person over another person, influence of one person over an organization). So, a system-provided node without any connections would have very low influence, and would not be tracked by the system.

This application incorporates by reference U.S. patent application Ser. Nos. 13/224,110, 13/224,117, 13/224,119, 13/224,138, and 13/224,149, all filed Sep. 1, 2011; Ser. No.

13/225,377 and 13/225,380, both filed Sep. 2, 2011; U.S. patent application Ser. Nos. 13/236,602, 13/236,606, and 13/236,617, all filed Sep. 19, 2011; U.S. patent application Ser. Nos. 13/532,653, 13/532,663, and 13/532,672, all filed Jun. 25, 2012; and U.S. patent application Ser. Nos. 13/738,233, 13/738,242, 13/738,248, 13/738,255, 13/738,261, and 13/738,264, all filed Jan. 10, 2013.

Some specific flows for determining a technique of the invention are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

Figure 11A:
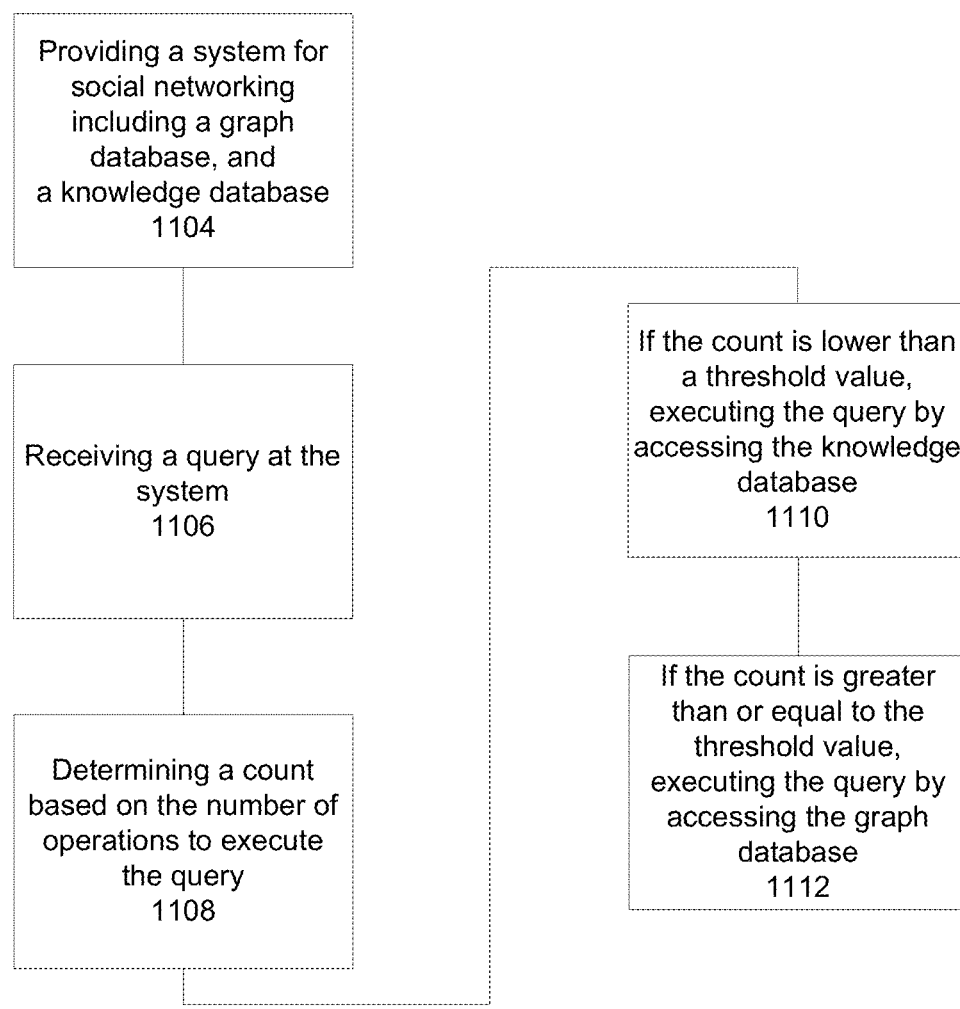
FIG. 11A shows a sample flow of executing queries in the system.

FIG. 11A shows a sample flow 1102 of executing queries in the system. In a step 1104, the system provides a tool for social networking including a graph database, and a knowledge database. These can be two separate databases, stored and executing on separate computers (e.g., servers). In an implementation, these two databases are factually equivalent. This means that the information stored in one of the databases, is also in the other database. However, depending on whether the information is in one or the other database, they can have different data structures, storage formats, storage space, or one or more of these and other differences.

In a step 1106, the system receives a query. The query can be a user provided query or a query generated by the system itself. An example of a query is whether person A is connected to an organization B. This can include where the system processes the query to identify first and second entities tracked by the system related to the query. For example, the system determines that the query involves person A and organization B. These are entities already tracked by the system, before the query is received.

In a step 1108, the system determines a count based on the number of operations to execute the query. In an implementation, the count is the number of join operations necessary to complete the query. Using the example query above, unless person A is directly linked to organization B, more than one join may be necessary to satisfy the query. For example, the system may need to determine persons that person A knows, interests that person A has related to organization B, or other connections person A has to satisfy the query. In another implementation, the count is based on a likelihood the first and second entities are two or more degrees of separation apart in the system. This can mean that, for example, the query will require at least one or more joins to determine a result.

In a step 1110, if the count is lower than a threshold value, the system executes the query by accessing the knowledge database. In an implementation, this does not include accessing the graph database. In a step 1112, if the count is greater than or equal to the threshold value, the system executes the query by accessing the graph database. In an implementation, this does not include accessing the knowledge database.

In an implementation, the system will use path types associated with the join operations to determine a relationship. For example, where person A is connected to organization B through a person B whom is a family member of person A, the system can show this relationship to a user.

Figure 11B:
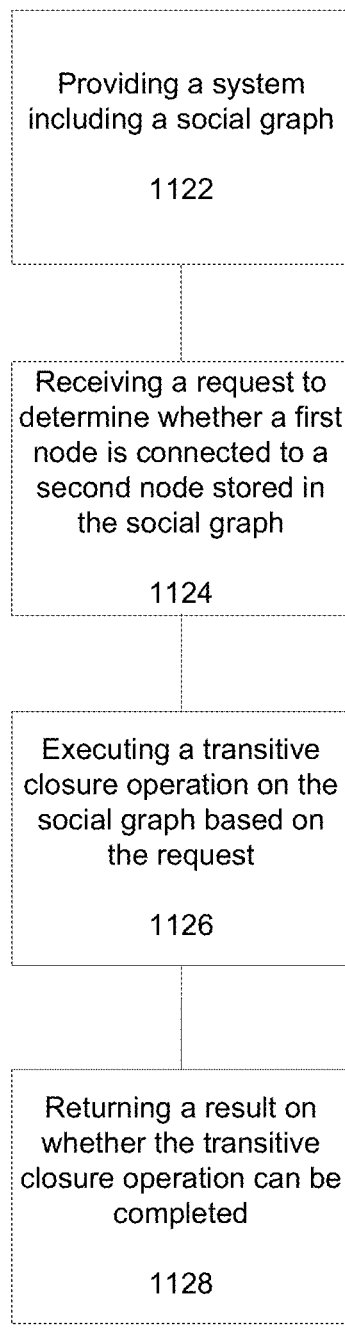
FIG. 11B shows a sample flow of performing searches in the system.

FIG. 11B shows a sample flow 1120 of performing searches in the system. In a step 1122, the system provides a system including a social graph. The social graph can include ghost nodes, where the ghost nodes are created and maintained by users of the system, system-provided nodes, where system-provided nodes are maintained and updated by the system, and edges connecting the ghost and system-provided nodes.

In a step 1124, the system receives a request to determine whether a first node is connected to a second node stored in the social graph.

In a step 1126, the system executes a transitive closure operation on the social graph based on the request. A transitive closure operation determines whether entities in the social graph are reachable. For example, transitive closure can determine whether it is possible for a first node to access a second node, by traversing other nodes in the social graph. The transitive closure operation can limit the number of nodes traversed (e.g., one, two, three, four, five, six, seven, or more) to satisfy the transitive closure operation.

For example, the system will crawl the social graph, to try and determine if the nodes as specified in the request are connected in the social graph. This connection can be multiple degrees of separation (e.g., one-, two-, three-, four-, or more degrees).

In a step 1128, the system returns a result on whether the transitive closure operation can be completed. The result can be a path which are the edges and nodes that satisfy the request. The path can be a connection between the first and second node that is not explicitly stored (e.g., there are no zero or first degree connections in the social graph between the first and second nodes) in the social graph before the result is determined. In an implementation, the system stores the path as a first-degree connection in the social graph between the first and second nodes.

In an implementation, a transitive closure operation can limit the number of nodes traversed (e.g., one, two, three, four, five, six, seven, or more) when determining whether the transitive closure operation is successful. In another implementation, a transitive closure operation uses an algorithm to determine whether the transitive closure operation is not only possible, but how relevant it is. For example, the system can use logic to rank a path that satisfies a given transitive closure operation and, if the relevance of the path to the query is low, return a result that the transitive closure operation is not satisfied.

In an implementation, the system can execute queries on groups of entities. For example, the system can find how one group of entities relate to a single entity or how a group of entities relate to another group of entities. These groups of entities can be user selected groups. The system can perform various operations on the system based on the groups (e.g., transitive closure, join, or other operations).

In an implementation, the system can be used to determine whether conflicts of interest exist between different groups of entities in the system. These groups can include one or more entities of the system. These can include organizations or persons. For example, the system can determine whether one or more persons in a first group have a conflicting relationship with one or more persons in a second group. A conflicting relationship can be two persons from competing companies, persons that are bound by confidentiality or other agreements to not compete, and other situations where a conflict of interest may arise. The system is flexible enough to perform graph operations (e.g., join, transitive closure, or other operations) on the social graph to determine paths, as well as analyze the components of paths (e.g., nodes or edges) to extract whether a relationship is a conflict of interest relationship. In another example, the system can determine whether one or more companies have a conflicting relationship with one or more persons.

In an implementation, the system does not explicitly store relationships (or paths) generated by a graph operation (e.g., join or transitive closure operation). For example, the system can determine that if two people A and B worked together at company C, then there is a connection. This can be determined by an algorithm that decides if A is related to C and B is related to C, then A is related to B. The system selectively stores the A is related to C relationship in the system. If the system determines a high score for the relationship (e.g., it is an important relationship), it may store it in a social graph (e.g., an edge between person A and B). In other situations, the system determines its score is lower than a threshold, and it is not stored. For instance, if the company is very big, it is likely that the system does not create the fact since the real-life weight of the relationship is likely low. The system is flexible in using different factors (or relationship types or edge types) when determining connections. The system can also selectively filter particular types of relationship types when performing graph operations. Further discussion related to this can be found in U.S. patent application Ser. No. 13/547,851, filed Jul. 12, 2012, which is incorporated by reference.

The system is flexible in how it stores and manipulates data. For example, a percentage of the data that the system presents to a user (on the front end) is deduced, that is, it is not stored in the system explicitly, but rather is generated from the data in the system.

In an implementation, the system defines different types of paths, that connect two entities, and write procedures that use those paths to generate relationships between them. For example, the system knows that A works for X and B works for X. The system uses this path definition (if a and b both work for x, then a knows b through x) to generate a cache of all of these paths.

In an implementation, the system uses path types to generate paths, represent one level of graph closure from the data the system collected in the system. For example, for a social graph stored in a graph database format in the system, graph closure (or transitive closure) is a method to determine whether two nodes in the social graph can be reached. The system can specify how many degrees of separation the two nodes can be from each other (e.g., one, two, three, four, five, or more degrees of separation) when calculating graph closure. Some nodes may not be able to satisfy transitive closure. For example, these nodes do not have edges connecting them or they may exceed a maximum number of degrees of separation as specified by the system.

Since the information in the system can be retrieved so quickly, calculating closure on longer paths can be done on-demand without sacrificing the end user experience. When the system calculates one level of graph closure via the paths table, this allows on-demand queries to find the paths between nodes in the system.

Figure 12:
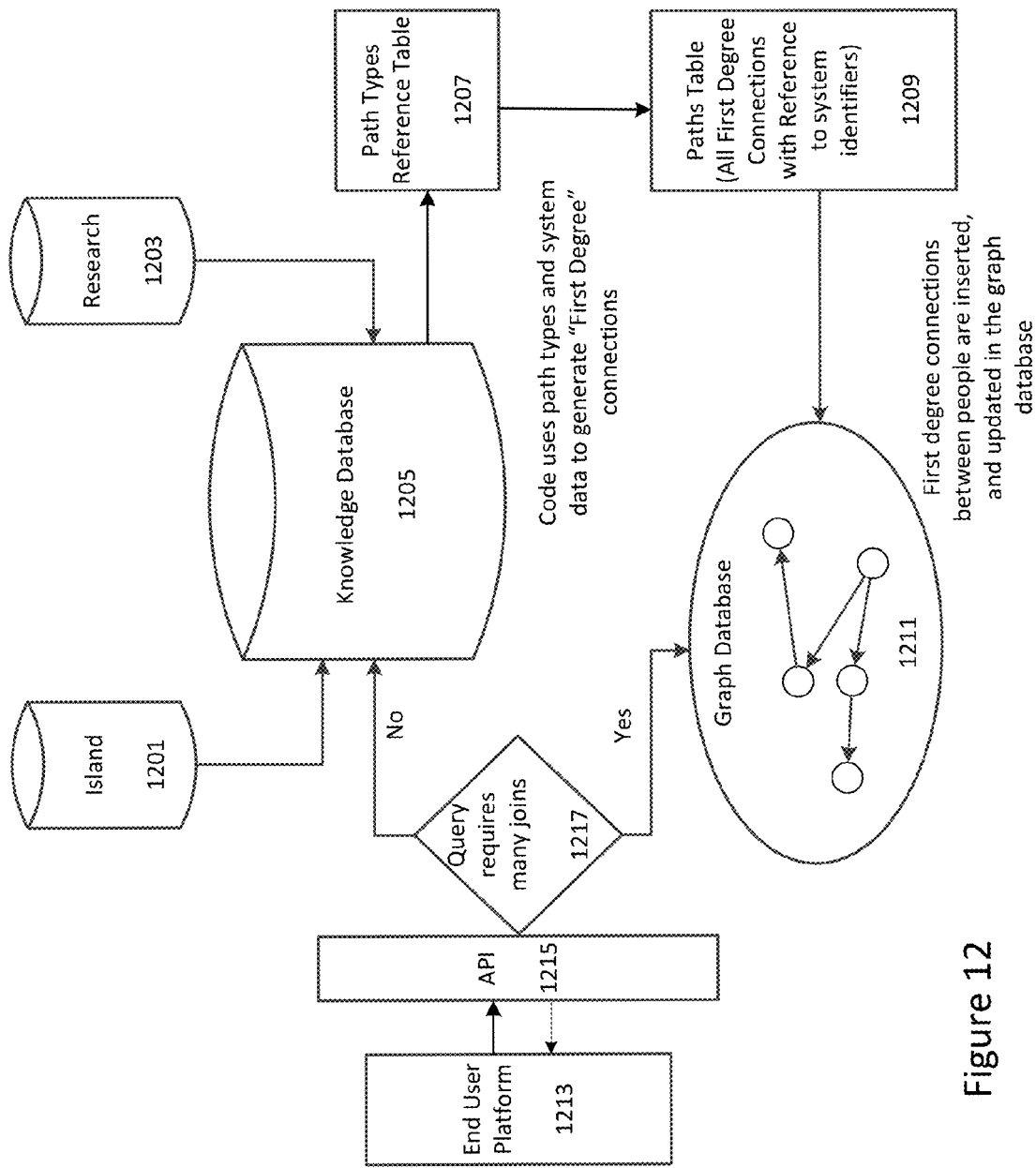
FIG. 12 shows a high-level overview of how a graph database and a knowledge database operate in the system.

FIG. 12 shows a high-level overview of how a graph database and a knowledge database operate in the system. In items 1201 and 1203, data is ingested and collected in island and research databases into a knowledge database 1205 in the system. For example, the knowledge database can be implemented using a relational database. In items 1207 and 1209, the system uses defined paths (Path types) stored in item 1207, to generate meaning and graph closure in the paths table, and retrieve information from a paths table 1209 using identifiers defined by the system. This means that the system uses path types and system data to generate "First Degree" connections, which the information in the research or island did not show. For example, the system's database shows that A is a board member of X and B is board member of X. The system takes these two facts to determine according to the paths table that says, A and B are co-board members of X. In item 1211, these new "first degree" connections are updated in the graph database of the system. For example, these new paths are migrated to the graph database where these connections will be available for on demand queries and analytics.

When a user requests a page (e.g., by making a query regarding one or more entities of the system), the user accesses an end user platform 1213 accessing the system through an application programming interface (or API) 1215. The system makes a determination, based on how to most efficiently retrieval the information requested by the user, to determine whether the user's request is best satisfied by the knowledge database 1205 or the graph database 1211. For example, when compared to relational databases, graph databases often execute faster for associative data sets. On the other hand, relational databases are often faster for record-based data sets.

In an implementation, the system determines whether to execute a user's query by using the knowledge database or the graph database by determining how many join operations are necessary in order to satisfy the user's query. In a database, a join operation determines possible relationships that connects two entities in the database. However, some relationships determined by the join operation may require greater multiple join operations. For example, if a first entity in the social graph is two-degrees of separation from a second entity, one join operation may be sufficient to determine a relationship between the first and second entities. In another example, if a first entity in the social graph is three-degrees of separation from a second entity, two join operations may be sufficient to determine a relationship between the first and second entities. Additional join operations may be necessary for entities that are more degrees of separation apart (e.g., four, five, six, seven, eight, or more degrees of separation).

Certain queries in the system require more joins than others in the system. For queries that require few or no joins, the knowledge database (e.g., a relational database) is sufficient. Otherwise, the graph database is used.

A first example is the query: "show me all the boards that Person A sits on." Since the knowledge database likely stores this information (e.g., when the system crawls for information about Person A, Person A is directly linked to each company they serve on), the system does not need to use the graph database to complete this query. A second example is the query: "show me all of the ways that the user is connected to Person A." To complete this query, the system would need to access the graph database, since the user is unlikely to be directly connected to Person A and so the system would need to execute queries on the graph database to determine a path between the user and Person A.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   providing a system including a social graph, wherein the social graph includes:
      a plurality of nodes of a first type, referred to as system-provided nodes, wherein system-provided nodes represent entities tracked by the system and include information gathered by the system;
      a plurality of nodes of a second type, different from the first type of node and referred to as ghost nodes, wherein ghost nodes represent entities created for users of the system and include information specified by users of the system;
      a plurality of edges of a first type, referred to as system-provided edges, wherein system-provided edges represent relationships categorized by at least one concept category of the system between two different system-provided nodes of the social graph; and
      a plurality of edges of a second type, different from the first type of edge and referred to as ghost edges, wherein each ghost edges represent relationships between a system-provided node and a ghost node of the social graph, and information on the relationships are specified by users of the system;
   maintaining the social graph comprising:
      allowing the plurality of system-provided nodes of the social graph to be directly coupled to other system-provided nodes by system-provided edges, wherein system-provided edges include information gathered by the system;
      allowing the plurality of ghost nodes of the social graph to be directly coupled to system-provided nodes by ghost edges, wherein ghost edges include information specified by users of the system;
      disallowing the plurality of ghost nodes from being directly coupled to other ghost nodes or to system-provided nodes using system-provided edges; and
      disallowing the plurality of system-provided nodes from being directly coupled to other system-provided nodes using ghost edges;
   receiving a request to determine whether a first node is connected to a second node stored in the social graph;
   executing a transitive closure operation on the social graph based on the request; and
   returning a result on whether the transitive closure operation can be completed.

2. The method of claim 1 wherein each system-provided edge of the plurality of system-provided edges connect exactly two system-provided nodes.

3. The method of claim 1 wherein the plurality of system-provided edges are stored in a paths database, wherein the paths database is stored separately from the social graph.

4. The method of claim 1 wherein the returning the result comprises a path of nodes and edges connected in the social graph.

5. The method of claim 4 wherein the path is not explicitly stored in the social graph.

6. The method of claim 4 wherein the first node is a ghost node.

7. The method of claim 6 wherein the first node is connected to a third node by a first ghost edge.

8. The method of claim 7 wherein the third node is separate from the second node.

9. The method of claim 7 wherein the path includes at most two ghost edges.

10. The method of claim 4 wherein each ghost node of the plurality of ghost nodes is connected to at least one system-provided node through a ghost edge.

11. The method of claim 1 wherein the first node is a system-provided node.

12. The method of claim 1 wherein the first node represents a person.

13. The method of claim 1 wherein the first node represents an organization.

14. The method of claim 1 wherein the executing the transitive closure operation comprises:
   determining first and second nodes coupled to the first system-provided node in the social graph;
   including the first node coupled to the first system-provided node; and
   ignoring the second node coupled to the first system-provided node.

15. The method of claim 14 wherein the first node coupled to the first system-provided node comprises a system-provided node and the second node coupled to the first system-provided node comprises a ghost node.

16. The method of claim 1 wherein the maintaining the social graph further comprises:
   receiving unfiltered information from an on-line source;
   filtering the unfiltered information to obtain information on entities;
   filtering the unfiltered information to obtain filtered information on entities;
   retrieving a plurality of ontology data structures, wherein each ontology data structure of the plurality of ontology data structures include a method of representing a relationship in an unstructured data format to a data format of the social graph, wherein the data format of the social graph comprises entities represented by at least one system-provided edge and at least two system-provided nodes;
   selecting ontology data structures from the plurality of ontology data structures to represent the filtered information on entities; and
   creating system-provided nodes and system-provided edges in the social graph to represented the filtered information on entities based on the selected ontology data structures.

17. The method of claim 1 wherein none of the system-provided edges of the plurality of system-provided edges are directly coupled to a ghost node.

18. The method of claim 1 wherein none of the ghost edges of the plurality of ghost edges are coupled to more than one system-provided node.

19. The method of claim 1 further comprising
   disallowing system-provided edges from directly coupling two ghost nodes.

20. The method of claim 1 further comprising
   disallowing ghost edges from directly coupling two ghost nodes or two system-provided nodes.

21. The method of claim 1 wherein each ghost edge of the plurality of ghost edges of the social graph is directly coupled to at least one ghost node.

22. The method of claim 1 wherein each ghost edge of the plurality of ghost edges of the social graph is directly coupled to at most one system-provided node.

23. The method of claim 1 wherein each ghost node of the plurality of ghost nodes of the social graph is at least two degrees of separation from every other ghost node of the social graph.

24. The method of claim 1 wherein the first system-provided edge includes information accessible by a first user but prevented from specifying information on the first system-provided edge.

25. The method of claim 1 wherein a first user is allowed to modify information associated with a first ghost node and disallowed to modify information associated with the first node.

26. The method of claim 25 wherein the first node is a system-provided node.

27. The method of claim 25 wherein the first node is a ghost node.

28. The method of claim 4 wherein the path comprises only system-provided edges and nodes.

29. A method comprising:
providing a system including a social graph, wherein the social graph includes:
a plurality of ghost nodes, wherein the plurality of ghost nodes are created and maintained by users of the system,
a plurality of system-provided nodes, wherein the plurality of system-provided nodes are maintained and updated by the system, and
a plurality of edges connecting the ghost and system-provided nodes;
maintaining the social graph comprising:
allowing the plurality of system-provided nodes of the social graph to be directly coupled to other system-provided nodes by system-provided edges, wherein system-provided edges include information gathered by the system;
allowing the plurality of ghost nodes of the social graph to be directly coupled to system-provided nodes by ghost edges, wherein ghost edges include information specified by users of the system;
disallowing the plurality of ghost nodes from being directly coupled to other ghost nodes or to system-provided nodes using system-provided edges; and
disallowing the plurality of system-provided nodes from being directly coupled to other system-provided nodes using ghost edges;
receiving a request to determine whether a first node is connected to a second system-provided node stored in the social graph, wherein the first and second nodes are at least two degrees of separation apart in the social graph and the first and second nodes comprises at least two system-provided edges between them in the social graph;
executing a transitive closure operation on the social graph based on the request; and
returning a path based on the transitive closure operation, wherein the path includes nodes connected by edges in the social graph.

30. The method of claim 29 wherein the path includes at least two nodes representing different entity types.

31. The method of claim 29 wherein the path includes the first and second nodes.

32. The method of claim 29 wherein the request is a user request.

33. The method of claim 29 wherein the executing the transitive closure operation comprises:
determining first and second nodes coupled to the first system-provided node in the social graph;
based on the first node coupled to the first system-provided node comprising a system-provided node, including the first node coupled to the first system-provided node; and
based on the second node coupled to the first system-provided node comprising a ghost node, ignoring the second node coupled to the first system-provided node.

34. A method comprising:
providing a system including a social graph, wherein the social graph includes:
a plurality of ghost nodes, wherein the plurality of ghost nodes are created and maintained by users of the system,
a plurality of system-provided nodes, wherein the plurality of system-provided nodes are maintained and updated by the system, and
a plurality of edges connecting the ghost and system-provided nodes;
maintaining the social graph comprising:
allowing the plurality of system-provided nodes of the social graph to be directly coupled to other system-provided nodes by system-provided edges, wherein system-provided edges include information gathered by the system;
allowing the plurality of ghost nodes of the social graph to be directly coupled to system-provided nodes by ghost edges, wherein ghost edges include information specified by users of the system;
disallowing the plurality of ghost nodes from being directly coupled to other ghost nodes or to system-provided nodes using system-provided edges; and
disallowing the plurality of system-provided nodes from being directly coupled to other system-provided nodes using ghost edges;
receiving a request to determine whether a first node is connected to a second node stored in the social graph wherein nodes are connected in the social graph when they are coupled to each other in the social graph by at least two system-provided nodes and one system-provided edge, and at most one ghost node or at most one ghost edge;
executing a transitive closure operation on the social graph based on the request;
if the system is able to determine that the first and second nodes are coupled by a X number of degrees of separation in the social graph, storing a first-degree connection in the social graph, wherein the first-degree connection is based on the transitive closure operation;
if the system determines that the first and second nodes are coupled by X+1 degrees of separation in the social graph, indicating that the request has been unsuccessful; and
if the system determines that the first and second nodes are not coupled in the social graph, indicating that the request has been unsuccessful.

35. The method of claim 34 further comprising:
before the executing a transitive closure operation, determining whether the first and second nodes are connected by one or fewer degrees of separation in the social graph.

36. The method of claim 34 wherein the social graph is implemented in a graph database.

37. The method of claim 34 wherein X represents an integer, supplied by the system.

* * * * *